United States Patent Office 3,387,931
Patented June 11, 1968

3,387,931
MECHANICAL MODIFICATION OF WET SILICA PIGMENT FOR REDUCTION OF FREE WATER RETENTIVITY THEREOF
Oliver W. Burke, Jr., 1510 SW. 13th Court, Fort Lauderdale, Fla. 33312
No Drawing. Continuation-in-part of application Ser. No. 458,379, May 24, 1965. This application Jan. 24, 1967, Ser. No. 611,295
7 Claims. (Cl. 23—182)

ABSTRACT OF THE DISCLOSURE

Precursor wet silica pigment of relatively high free water retentivity precipitated by acidulation of aqueous alkali metal silicate is subjected to mechanical pressing between opposed surfaces which is shown to not only express aqueous liquid from the wet pigment but to also rearrange its structure. The new structure of the pressed pigment is characterized by its formation of polygonal aggregates in the pressed wet cake, and by the fact that its ability to retain free water, which term includes water and watery solutions, is materially reduced. The reduction of free water retentivity is of economic value as it materially reduces the cost of recovering dry pigment.

This application is a continuation-in-part of copending application Ser. No. 458,379, filed May 24, 1965, now abandoned.

BACKGROUND OF THE INVENTION (a) *Field of the invention.*—The field to which this invention pertains is that of the production of silica pigments, which are silicon acids and acid anhydrides and may contain in minor proportion oxides and/or salts of metals as well as bound water.

(b) *Description of the prior art.*—In known processes for the elimination of free water from silica slurry to produce a dry silica pigment product, a large amount of free water has had to be removed by drying at considerable cost, because of the free water retentivity of the silica pigment. Because of this free water retentivity, the formation of a cake by the filtration of slurries of silica pigment prepared in the usual manner, has resulted in filter cakes having a solids content of only about 9 to 24% solids, based on an undried cracked standard test filter cake as hereinafter more fully described. A cake of 17% solids contains about 5 parts of free water for each part of silica pigment present, and one of 20% solids contains 4 parts of free water for each part of silica pigment present, by weight, and the cost of removal of these large proportions of free water by drying is a substantial part of the cost of producing the dry silica pigment for use in reinforcement of rubber and other purposes.

Summary of invention

The present invention resides in the processed wet silica pigment of rearranged structure having reduced free water retentivity and in the method of processing precursor wet silica pigment for producing the same as hereinafter described and exemplified, and is more particularly pointed out in the appended claims. The product, inter alia, is characterized as set forth in the above abstract, and has the utility therein set forth.

Objects of the invention, severally and interdependently, are:

(1) To reduce the free water retentivity of the silica pigment by alteration of its structure prior to drying thereof.

(2) To produce a processed silica pigment containing free water and having a reduced free water retentivity.

(3) To provide a process for increasing the solids content of a silica pigment product of the class described to from 25 to 55%, preferably 30 to 55%, before drying, thereby to greatly reduce the cost of drying equipment and of the drying operation.

(4) To provide a wet silica pigment product of the class described, having a dry solids content of from 25 to 55%, preferably 30 to 55%, thereby reducing the volume of the product and the costs of further handling and treatment thereof.

(5) To provide a processed silica pigment having a structure and a free water retentivity such that, as an undried cracked standard test filter cake, it retains only from 3 to 0.8, preferably 2.3 to 0.8, parts of occluded free water per part of the silica pigment, dry basis, by weight.

Other objects and advantages of the invention will be apparent from the following description of illustrative embodiments thereof.

The invention may be applied generally to wet silica pigment prepared from an aqueous solution of alkali metal silicate. It may be applied to undried precipitated silica pigment prepared by the known processes of the prior art, or to such pigment prepared to augment its filterability by the methods of copending applications Ser. Nos. 458,131 and 458,132, filed May 24, 1965, or to silica pigment previously prepared to have a free water retentivity somewhat reduced, by the process of my copending application Ser. No. 458,420 filed May 24, 1965. In each instance, by the present invention the structure of the precursor silica pigment is modified in a manner to reduce its free water retentivity as above described. Among the known processes above referred to are those described in Burke et al. U.S. Patent No. 3,250,594, issued May 10, 1966 on an application filed Dec. 30, 1964, and those of the U.S. patents referred to therein.

DESCRIPTION OF THE PREFERRED EMBODIMENTS

General description

Silica pigments prepared by the acidulation of aqueous solutions of alkali metal silicate are well known to the art and are used, inter alia, as pigments for the reinforcement of natural and synthetic rubbers. Such pigments produced from an aqueous solution of alkali metal silicate are subjected to various treatments before drying, e.g. filtration and washing, and treatment with various chemical modifiers such as acid or metal salts.

The silica pigments so produced are aggregates of smaller particles and have definite structures. They also have free water retentivity. The free water concerned is that which is retained or occluded by the pigments but which can be removed therefrom by heating at a temperature of 105° C. for a period of 24 hours in a laboratory oven, and is distinguished from the much smaller content of bound water of the pigment, which can only be driven off by heating at ignition temperatures in the range of 1000 to 1200° C.

In copending applications Ser. Nos. 458,131 and 458,-132 it is disclosed that the filterability of a slurry of silica pigment produced by the acidulation of an aqueous solution of alkali metal silicate may be improved by conducting at least the critical part of the acidulation in the substantial absence of any significant shear. As therein described, the filter cake from such a slurry has highly augmented free water retentivity, filters rapidly, and washes rapidly on the filter, thus effecting a substantial saving in the time of filtration compared to previously known processes but the filter cake so produced contains only about 9% to 14% solids as an undried cracked standard test filter cake prepared as hereinafter described, i.e. from about 10 parts to 6 parts, preferably 9 to 7 parts, of water for each part of silica therein, by weight, dry basis.

In copending application Ser. No. 458,420 I have disclosed, inter alia, that the free-water retentivity of a slurry of silica pigment produced by the acidulation of alkali metal silicate—either in accordance with prior art processes which afford fair filterability or in accordance with said copending applications Ser. Nos. 458,131 and 458,132 which afford better filterability—may be reduced to a substantial extent by fluidizing the filter cake of relatively high free water content by subjecting it to mechanical shear, i.e. rupture by dynamic impact, sufficiently intense to modify the structure of the water-carrying silica pigment and lower its free water retentivity. Such processing is advantageously employed after the filtration and washing of the silica, and prior to chemical treatment or final filtration thereof, but the reduction in free water retentivity permits the silica to pack to a dense cake on the filter, rendering the filtration slow and rendering the washing of the filter cake more difficult.

The drying of any of such silica pigments thus involves costs which are directly related to the structure and free-water retentivity of the silica. The present invention affords a method which can reduce the free water retentivity of the wet silica pigments to a greater extent than has heretofore been attained, and affects a marked saving in cost of processing the silica pigment.

Furthermore, in the washing of the silica, the greater free water retentivity, required for ease of filtering and washing, requires more thorough washing, because any salts or other non-volatile materials contained in the free water are concentrated and remain in the silica on drying. The present invention, however, since it can reduce the amount of free water to a greater extent than has been found possible with the invention of my copending application Ser. No. 458,420 or any other process known to applicant, therefore further reduces the concentration of residues and the thoroughness of washing required.

The free water retentivities of silica pigments are readily measured and compared by the amounts of free water they retain in the form of undried cracked standard test filter cakes. The standard test used herein and in my aforesaid copending cases, is made at room temperature (25° C.), with a Büchner funnel type filter having a 1/10 square foot filter area, using filter cloth, e.g. nylon filter cloth, in place of filter paper, and employing a vacuum of 25±0.2 inches of mercury. Herein, enough of the slurry of the silica pigment was supplied to form a filter cake which had a thickness when it first cracked of about 1/2 inch.

The silica pigment thus reduced to an undried cracked standard filter cake is removed from the filter and the weight ratio of occluded free water to the silica pigment, dry basis, is determined by weighing a portion of the cake, drying it to constant weight, e.g. for 24 hours at 105° C. in a laboratory oven, weighing the resulting dry silica pigment, and determining the occluded free water by difference. As previously indicated, the wet precursor silica pigment to which the present invention is applied may have a free water retentivity such that in the undried cracked standard filter cake it retains occluded free water in the range of about 1.5 to 10 parts of occluded water per part of silica pigment (dry basis) by weight.

In the practice of the present invention the said wet precursor silica pigment is confined in a segregated body having provision for flow of released liquid therefrom, and to opposed surfaces of said body mechanical pressure is applied of sufficient intensity to break down the water occluding structure of the silica pigment to thus reduce its free water retentivity and release previously occluded free water therefrom, the mechanical pressure being maintained for a sufficient time to enable flow of the so released water from the body. These steps may be effected by wrapping the wet silica in a foraminous or reticulated wall such as canvas or filter cloth and placing such wrapped cake within the surrounding rectangular wall of a so-called picture frame mold and between relatively movable top and bottom pressure plates, and applying a load to the upper plate to produce relative movement between the plates for effecting the break-down of the water occluding structure by the slow compression of the structure as the released occluded water is expressed. Alternatively, the wet precursor silica pigment may be confined within a suitably backed up cylindrical screen or other foraminous or reticulated wall between plungers at least one of which is movable relative to the other to break the silica structure, the released water flowing through the foraminations or reticulations of the screen or wall, the non-compressibility of the liquid controlling the rate and degree of crushing of the silica structure.

The pressures found suitable range from 100 to 1000 pounds per square inch of the surface to which the mechanical pressure is applied, and the pressure applied is preferably kept near the lower end of this range, e.g. between 100 and 500 p.s.i. during the earlier stages of the processing, so that silica pigment does not become so displaced toward the foraminations as to build up a hard cake proximate thereto with consequent maintenance of a high hydrostatic pressure within the cake interfering with the uniform breaking down of the silica structure. Such suitable pressures effect quite large reduction in the free water retentivity of the wet silica pigment in moderate intervals of time. Where hold-up time is less critical, then lower pressures, e.g. down to 50 p.s.i. or lower, may sometimes be employed. Where maximum reduction in water retentivity is desired, the wet precursor silica is preferably subjected to mechanical pressure which is increased progressively or in steps during the collapse of the silica structure so as to maintain a more uniform collapse across the entire cross-section thereof. The product of treatment at, say, a moderate pressure, may also form precursor wet silica pigment for a subsequent treatment at the same or an augmented pressure. This procedure is especially advantageous when accompanied by a redistribution of the pigment throughout the cross-section of the body before the further treatment thereof.

The time required to effect the processing of the wet precursor silica pigment by the present invention varies somewhat with the structure of the silica and the pressures employed. In general, application of a pressure from 2 to 20 minutes suffices to release and permit flow from the body of substantially all the water releasable by the reduction of structure and retentivity effected by a given crushing pressure. This is especially so when the precursor silica being treated has a structure which will slowly crush as internal fluid pressure is released, without undue flow and caking of silica adjacent the foraminous walls. Where a very wet silica is being processed, and low pressures are first applied for an interval followed by higher pressures, a longer period of time may be required to attain a given reduction in retentivity. Thus the invention may be employed to lower the free water retentivity of wet silica pigments which have high retentivity to a value within the intermediate or even the low retentivity range, or may be employed to lower the retentivity of silica pigments in the intermediate range to lower values therein or in the low retentivity range, or may be applied to lower still further the retentivity of silica pigments which have previously been subjected to the maximum lowering attainable by the process of my copending application Ser. No. 458,420. Thus advantages of the present invention are attained to a substantial degree whenever it is employed to lower the free water retentivity of a wet silica pigment to a value in the range of 0.8 to 3 parts of water per part of silica pigment dry basis, by weight, the attained value being at least 0.5 part lower than that of the precursor wet silica pigment.

As will be apparent from the following examples, the present invention provides inter alia, a prepared silica pigment derived from precursor wet silica pigment produced from an aqueous solution of alkali metal silicate, said prepared silica pigment having a free water retentivity such that as an undried cracked standard test filter cake it retains only from 0.8 to 3 preferably 1 to 1.5 parts of occluded free water per part of the silica pigment, dry basis, by weight.

The above general features of the invention, and features contributory thereto in particular embodiments, will be more fully understood by reference to the following examples of procedures and products embodying the invention.

Examples 1–28

In the several examples selected to illustrate the invention herein, the precursor silica pigment employed was one precipitated from an aqueous solution of sodium silicate with the aid of carbon dioxide and filtered and washed and subsequently treated with 10% sulfuric acid to a pH of 4.0. This precursor silica pigment had a free water retentivity such that as an undried cracked standard test filter cake it retained occluded water to the extent of 4.85 parts of occluded free water per part of silica pigment (dry basis) by weight, corresponding to a solids content of 17.1%, and was used in Examples 1–19 without modification. For Examples 20–28 a portion of a slurry of this silica was subjected to some additional shear using a propeller agitator, and this portion of the silica showed a retentivity such that as the undried cracked standard test cake it contained 4.43 parts of occluded water per part of silica pigment (dry basis) by weight, corresponding to a solids content of 18.4%.

Table A gives the details of the several examples, the size of the mold, surface pressures used, times of application, the amount of wet precursor silica pigment used, the weights of the modified structure cakes, and comparisons of the dry solids contents of the latter with those of the corresponding wet precursor silica pigments.

the pressure was not applied too rapidly. An excessively fast application may burst the filter cloth or reduce the pour space at the boundary of the silica filter cake, in which case the modified cake will not be adequately modified and will have a comparatively wet interior. Two to three minutes were therefore used in bringing the pressure up to the full pressure value applied during the pressing period. Pressing times of from one to twelve minutes were compared and it was found that three minutes of pressing time usually removed most of the water released by the crushing of the silica structure.

Example 29

This Example 29 is included to illustrate that in order to most effectively break down the water occluding structure of the silica pigment and thus obtain the desired reduction of the capacity of such pigment to retain occluded water, it is necessary to employ force applied to opposed surfaces of the silica structure of the body as contrasted with fluid pressure force applied to the occluded fluid content therein. As shown in Examples 1–28 a pressure of about 200 p.s.i. applied to the surfaces of the silica structure of the body effected a marked reduction in the free water retentivity thereof. Wet silica pigment slurry similar to that employed as precursor wet silica pigment in said Examples 1–28 was employed in this Example 29. A portion of this slurry was subjected to pressure filtration in a pressure filter having 200 p.s.i. of gas pressure (nitrogen) applied to the silica slurry, and this pressure was maintained for 61 minutes, i.e. until the filter cake had formed and the gas had burst through the cake. The yield of one inch thick filter cake was 945 grams and had a dry solids content of 21.6% by weight. 845 grams of this cake was wrapped in canvas and placed in a 6" x 6" picture frame mold as in Examples 16 to 28 and subjected to a pressure applied through the pressure plate of the mold of 200 p.s.i., this pressure being attained in two minutes and being maintained for TABLE A.—MODIFICATION OF WET SILICA PIGMENT STRUCTURE TO REDUCE THE FREE WATER RETENTIVITY THEREOF

| Example No. | Mold Cross-Section (Inches) | Pressure on Silica | | | Wet Silica Pigment Charge | | Cake of Modified Structure | | Percent Solids | |
|---|---|---|---|---|---|---|---|---|---|---|
| | | Amount Applied (p.s.i.) | Time to Reach (Min./Sec.) | Time at Pressure (Min.) | Weight (Grams) | Thickness (Inches) | Weight (Grams) | Thickness (Inches) | As Charged | As Modified |
| 1 | 12 x 12 | 215 | 2/28 | 3 | 5,000 | 2.4 | 2,852 | 7/8 | 17.1 | 1 (30.0) |
| 2 | 12 x 12 | 215 | 2/26 | 6 | 5,000 | 2.4 | 2,190 | 3/4 | 17.1 | (39.1) |
| 3 | 12 x 12 | 215 | 2/26 | 9 | 5,000 | 2.4 | 2,040 | 11/16 | 17.1 | 41.7 |
| 4 | 12 x 12 | 215 | 2/45 | 1 | 3,500 | 1.7 | 1,960 | 7/8 | 17.1 | 31.0 |
| 5 | 12 x 12 | 215 | 2/27 | 2 | 3,500 | 1.7 | 1,820 | 3/4 | 17.1 | 33.2 |
| 6 | 12 x 12 | 215 | 2/27 | 3 | 3,500 | 1.7 | 1,740 | 3/4 | 17.1 | (34.5) |
| 7 | 12 x 12 | 215 | 2/26 | 4 | 3,500 | 1.7 | 1,688 | 3/4 | 17.1 | 35.6 |
| 8 | 12 x 12 | 215 | 2/27 | 8 | 3,500 | 1.7 | 1,580 | 1/2 | 17.1 | 38.6 |
| 9 | 12 x 12 | 215 | 2/26 | 3 | 1,750 | 0.8 | 794 | 3/8 | 17.1 | 38.4 |
| 10 | 12 x 12 | 215 | 2/26 | 3 | 7,000 | 3.3 | 4,812 | 1 5/8 | 17.1 | 25.0 |
| 11 | 12 x 12 | 215 | 2/28 | 9 | 7,000 | 3.3 | 3,218 | 1 1/16 | 17.1 | 36.4 |
| 12 | 9 x 9 | 384 | 4/47 | 3 | 2,800 | 1.3 | 1,229 | 19/32 | 17.1 | (39.1) |
| 13 | 9 x 9 | 384 | 2/16 | 6 | 2,800 | 1.3 | 1,074 | 9/16 | 17.1 | (44.8) |
| 14 | 9 x 9 | 384 | 2/26 | 12 | 2,800 | 1.3 | 1,056 | 1/2 | 17.1 | 45.4 |
| 15 | 9 x 9 | 384 | 2/31 | 3 | 1,960 | 0.9 | 880 | 1/2 | 17.1 | 37.0 |
| 16 | 6 x 6 | 860 | 4/47 | 3 | 1,243 | 0.6 | 459 | 9/16 | 17.1 | (47.2) |
| 17 | 6 x 6 | 860 | 2/16 | 6 | 1,243 | 0.6 | 424 | 3/8 | 17.1 | (51.2) |
| 18 | 6 x 6 | 860 | 2/26 | 12 | 1,243 | 0.6 | 410 | 5/16 | 17.1 | 51.9 |
| 19 | 6 x 6 | 860 | 2/27 | 3 | 870 | 0.4 | 336 | 1/4 | 17.1 | 42.5 |
| 20 | 6 x 6 | 860 | 1/45 | 3 | 1,000 | 0.5 | 508 | 1/2 | 18.4 | (35.2) |
| 21 | 6 x 6 | 860 | 1/50 | 6 | 1,000 | 0.5 | 444.5 | 3/8 | 18.4 | (40.3) |
| 22 | 6 x 6 | 860 | 1/54 | 12 | 1,000 | 0.5 | 421 | 3/8 | 18.4 | 42.5 |
| 23 | 6 x 6 | 530 | 2/28 | 3 | 1,000 | 0.5 | 469.5 | 1/2 | 18.4 | (38.9) |
| 24 | 6 x 6 | 530 | 2/33 | 6 | 1,000 | 0.5 | 404.5 | 3/8 | 18.4 | (45.1) |
| 25 | 6 x 6 | 530 | 2/44 | 12 | 1,000 | 0.5 | 381.0 | 5/16 | 18.4 | 47.9 |
| 26 | 6 x 6 | 265 | 3/59 | 3 | 1,000 | 0.5 | 406.5 | 7/16 | 18.4 | (44.2) |
| 27 | 6 x 6 | 265 | 2/36 | 6 | 1,000 | 0.5 | 370.5 | 7/16 | 18.4 | (48.5) |
| 28 | 6 x 6 | 265 | 2/47 | 12 | 1,000 | 0.5 | 350.0 | 5/16 | 18.4 | 51.3 |

[1] Values in brackets calculated from next unbracketed value on basis of data shown.

In each of these examples, the filter cake was wrapped in two layers of filter cloth and placed in a rectangular steel picture mold. Three different sizes of molds were used: 12" x 12", 9" x 9", 6" x 6", and as pressure plates were used square wooden blocks sized to fit the molds and subject to the pressures indicated in Table A. A screen was interposed between the picture mold and bottom plate to provide for escape for the water released by the crushing of the silica pigment structure. In first applying the pressure, care was taken to be sure that three minutes. The 845 grams of precursor cake were reduced to 480 grams having a dry solids content of 34.4% by weight. A 122 gram sample of this modified wet silica pigment so produced was slurried with 170 grams of water and on filtration showed a free water retentivity such that as the undried cracked standard test filter cake (produced in 130 minutes) it contained only 2.33 parts of occluded water per part of silica pigment, corresponding to 30% dry solids content, by weight, thus demonstrating that the product had been structurally modified by the treatment to reduce its free water retentivity.

When in place of the nitrogen pressure filter cake, one uses as precursor silica pigment slurry having a lesser solids content, e.g. concentrated to 13.5% solids for convenience of handling, essentially the same reduction of free water retentivity is effected by the process, and thus essentially the same product is obtained.

Example 30

As hereinbefore noted, the new structure of the processed wet silica pigment of the present invention is characterized not only by the fact that its ability to retain free water is substantially reduced but also by the fact that its rearranged structure is of a form that causes it to fall apart into polygonal aggregates, viz: the wet cake falls apart into polygonally subdivided form on removal from the press.

Charged to the reactor were 405 lbs. of 41° Bé. aqueous sodium silicate containing alkalinity 8.9% as $Na_2O$ and 28.7% $SiO_2$, and also charged were 1800 lbs. of water, and the temperature was raised to 70° C. and maintained at that value. Carbon dioxide as acidulating agent was introduced at a constant rate for 220 minutes, at which time the Tyndall effect appeared, and the constant rate was then doubled, and after 555 minutes the acidulation achieved was 102% of that theoretically necessary to convert the alkalinity to $Na_2CO_3$, and thereafter, over a period of four hours addition of carbon dioxide was continued, raising the achieved acidulation to approximately 120% of theoretical, conditions of low shear agitation being maintained throughout.

The resulting silica pigment slurry was filtered and washed, yielding a filter cake containing 11% solids, dry basis. A sample of this filter cake slurried with an equal weight of water was filtered and the filtrate had a resistivity of 1250 ohm-centimeters.

Three portions of this filter cake were employed for the preparation of the precursor wet silica pigments of the following Examples 30–a, 30–b, and 30–c.

Example 30–a

A 5450 gram portion of the filter cake of Example 30, containing 600 grams of silica pigment, dry basis, was slurried with 500 ml. of water and 150 ml. of 10% sulfuric acid was added, resulting in a pH of 7.0 of the aqueous serum of the silica slurry. There were then added to this slurry 150 ml. of a 10% aqueous solution of aluminum sulfate as $Al_2(SO_4)_3.12H_2O$. The resulting slurry had a pH of the liquid of 4.0, and on filtering produced a wet cake containing 12.8% solids, dry basis, i.e. a cake containing 6.84 parts of retained free water for each part of pigment, dry basis.

A 2150 gram portion of the cake thus produced was wrapped in canvas filter cloth and the so segregated body of precursor wet silica pigment was pressed in a 9 inch by 9 inch metal picture frame mold and subjected to mechanical pressure, applied by a hydraulic ram to opposed surfaces of the body, of 31,000 lbs., i.e. about 383 p.s.i. based on 81 square inches cross-section of the body of silica pigment. The pressure of 31,000 lbs. was attained in a period of 2 minutes and held for a period of four minutes at which time the expression of water from the cake was observed to have substantially ceased. The wrapped cake was removed from the press and was observed to have a structure in the form of polygonal aggregates with side planes generally perpendicular to the top and bottom planes thereof. The pressed cake weighed 805 grams and contained 34.2% solids, i.e. only 1.86 parts of water per part of silica pigment, dry basis, and when aqueously reslurried and re-filtered, produced a wet filter cake of substantially the same high solids content. The reduction in the free water retentivity of the silica pigment structure from 6.84 to 1.86 parts of water per part of silica, dry basis, reduced by nearly 75% the amount of water required to be removed for drying the pigment.

Example 30–b

A 5450 gram portion of the filter cake of Example 30, containing 600 grams of silica pigment, dry basis, was slurried with 500 ml. of water and 210 ml. of 10% sulfuric acid was added, resulting in a serum pH of 3.5 to 4.0. This slurry was filtered and produced a wet cake containing 12.2% solids, dry basis, i.e. a cake containing 7.2 parts of retained free water for each part of pigment, dry basis.

A 3000 gram portion of the so formed cake was wrapped and expressed as in Example 30–a, the pressure of 31,000 lbs, being attained in 2⅔ minutes and being maintained for 6 minutes thereafter.

The resulting pressed cake weighed 995 grams and contained 36.7% solids, i.e. only 1.72 parts of water per part of silica pigment. The drying load was thus reduced by over 76%.

Example 30–c

A 5450 gram portion of the filter cake of Example 30, containing 600 grams of silica pigment, dry basis, was slurried with 500 ml. of water, and 400 ml. of 10% aluminum sulfate as $Al_2(SO_4)_3.12H_2O$ was added, and the liquid of the slurry then had a pH in the range of 4.0 to 4.5. This slurry was filtered and the wet cake contained 12.0% solids, dry basis, i.e. 7.33 parts of retained water for each part of pigment, dry basis.

A 3000 gram portion of the so formed cake was treated as in Examples 30–a and 30–b, the pressure of 31,000 lbs. being attained in 2⅓ minutes and being held for 5 minutes thereafter.

The resulting cake weighed 1160 grams and contained 31% solids, dry basis, i.e. 2.22 parts of free water per part of silica pigment, dry basis. The drying load was thus reduced by about 70%.

Alternative to the procedures and in Examples 30–a, 30–b, and 30–c for after-treatment of the silica pigment with mineral acid and/or metal salt before the mechanical rearrangement of the structure thereof, such after-treatments may be practiced after such rearrangement by re-slurrying the wet silica pigment of reduced free water retentivity, since the altered structure thereof on filtration produces a filter cake substantially retaining the high solids content produced by the processing of the present invention.

Furthermore, since the wet silica pigment containing, for example, 2 parts of retained free water per part of pigment, dry basis, can be slurried, e.g. for after-treatment, with about the same quantity of added water required to slurry a wet silica pigment containing, for example, about 7 parts of retained water per part of silica pigments, the improved wet silica pigments produced by the present invention are well adapted for economical spray drying.

Also, since the wet silica pigment of reduced free water retentivity provided by the present invention, on drying, will contain a lesser part of residues from drying of the serum than a wet silica pigment of greater free water retentivity, the washing load, for a given purity of product, is also reduced by the invention.

It will thus be seen that by the present invention the structure of a precursor wet silica pigment, which imparts free water retentivity thereto, may be modified to yield a wet cake of higher solids content, and indeed of solids content higher than heretofore obtained without drying, thus to reduce the drying load, which constitutes a considerable part of the cost of production of the dry pigments.

While there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A processed wet silica pigment derived from precursor wet silica pigment produced from an aqueous solution of alkali metal silicate, said processed wet silica pigment as a wet pressed cake having a polygonal structure, and said processed wet silica pigment also having a free water retentivity such that as an undried cracked standard test filter cake it retains occluded free water only in the range of from 0.8 to 3 parts per part of the silica pigment, dry basis, by weight.

2. A method of processing precursor wet silica pigment produced from an aqueous solution of alkali metal silicate, which precursor silica pigment has a free water retentivity such that as an undried cracked standard test filter cake it retains occluded free water in the range of about 1.5 to 10 parts of occluded free water per part of silica pigment, dry basis, by weight, which method comprises:

(a) confining the wet precursor silica pigment in a segregated body having provision for flow of released liquid therefrom, (b) applying to opposed surfaces of said body mechanical pressure of sufficient intensity and for a sufficient time to break down the free water occluding structure of said precursor pigment, express the so released water therefrom, and impart a polygonal structure to the pressed cake thereof, thereby reducing the free water retentivity of the processed wet silica pigment to a value in the range of 0.8 to 3.0 parts of water per part of silica pigment, dry basis, by weight, which value is at least 0.5 part lower than that of said precursor wet silica pigment.

3. A method of processing as defined in claim 2, wherein said mechanical pressure is applied by confining the wet precursor pigment within a foraminous wall between opposed relatively movable surfaces through relative movement of which the pressure is applied to the silica structure.

4. A method of processing as defined in claim 2, wherein the mechanical pressure is maintained until the expression of released free water from the pigment cake is substantially complete.

5. A method of processing as defined in claim 2, wherein the intensity of mechanical pressure employed is in the range of 50 to 1,000 pounds per square inch of the surface to which the pressure is applied.

6. A method of forming from precursor wet silica pigment, a processed wet silica pigment of a structure which has a reduced free water retentivity, which method consists essentially in subjecting a body of the precursor wet silica pigment to mechanical pressure applied to opposed surfaces of the body of sufficient intensity and for a sufficient time, while removing water expressed from the body, to impart to the residual cake a structure in the form of polygonal aggregates with side planes generally perpendicular to the said opposed surfaces of the body.

7. A method as defined in claim 6, wherein the intensity of mechanical pressure employed is in the range of 50 to 1,000 pounds per square inch of the surface of the body to which the mechanical pressure is applied.

References Cited

UNITED STATES PATENTS

| | | | |
|---|---|---|---|
| 1,751,955 | 3/1930 | Stoewener | 23—182 |
| 2,358,202 | 9/1944 | Behrman | 23—182 |
| 3,094,384 | 6/1963 | Bertolacini. | |

OSCAR R. VERTIZ, *Primary Examiner.*

A. J. GREIF, *Assistant Examiner.*